United States Patent
An

(10) Patent No.: US 10,909,521 B2
(45) Date of Patent: Feb. 2, 2021

(54) VEHICLE SETTLEMENT SYSTEM AND METHOD

(71) Applicant: HYUNDAI MOTOR COMPANY, Seoul (KR)

(72) Inventor: Daeyun An, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 690 days.

(21) Appl. No.: 15/378,408

(22) Filed: Dec. 14, 2016

(65) Prior Publication Data

US 2018/0082281 A1 Mar. 22, 2018

(30) Foreign Application Priority Data

Sep. 19, 2016 (KR) .......................... 10-2016-0119340

(51) Int. Cl.
*G06Q 40/00* (2012.01)
*G06Q 20/32* (2012.01)
(Continued)

(52) U.S. Cl.
CPC ............ *G06Q 20/325* (2013.01); *B60R 1/00* (2013.01); *B60R 11/04* (2013.01); *G06Q 20/12* (2013.01);
(Continued)

(58) Field of Classification Search
CPC .... G06Q 20/327; G06Q 20/10; G06Q 20/322; G06Q 20/40
See application file for complete search history.

(56) References Cited

U.S. PATENT DOCUMENTS 6,129,406 A * 10/2000 Dauvergne ............. B60K 37/00
296/70
6,158,655 A * 12/2000 DeVries, Jr. ............. B60R 1/12
235/380
(Continued)

FOREIGN PATENT DOCUMENTS

CN  1783112 A  6/2006
CN  101960497 A  1/2011
(Continued)

OTHER PUBLICATIONS

Muller (Load cells in force sensing analysis—Theory and a novel application; IEEE Instrumentation and Measurement Magazine https://www.researchgate.net/publication/224108265_Load_cells_in_force_sensing_analysis_-_Theory_and_a_novel_application Mar. 2010) (Year: 2010).*

*Primary Examiner* — Sarah M Monfeldt
*Assistant Examiner* — Mark H Gaw
(74) *Attorney, Agent, or Firm* — McDonnell Boehnen Hulbert & Berghoff LLP

(57) ABSTRACT

Disclosed herein are a vehicle settlement system and method, and more particularly, a vehicle settlement system and method that utilize object recognition information as settlement authentication information. The vehicle settlement system according to an embodiment includes a vehicle control system, a financial settlement server, and a store system. Here, the vehicle control system includes an object recognition module that is provided to collect object information for settlement authentication, and a vehicle control system control unit that recognizes an object based on the object information collected by the object recognition module.

15 Claims, 14 Drawing Sheets

(51) Int. Cl.
  *G06Q 20/12* (2012.01)
  *B60R 11/04* (2006.01)
  *G07B 15/06* (2011.01)
  *G06Q 20/14* (2012.01)
  *B60R 1/00* (2006.01)
  *G06Q 20/40* (2012.01)
  *B60R 11/00* (2006.01)

(52) U.S. Cl.
  CPC ......... *G06Q 20/127* (2013.01); *G06Q 20/145* (2013.01); *G06Q 20/4014* (2013.01); *G07B 15/063* (2013.01); *B60R 2011/0005* (2013.01); *B60R 2011/0047* (2013.01); *B60R 2300/20* (2013.01); *B60R 2300/406* (2013.01); *B60R 2300/80* (2013.01)

(56) References Cited

U.S. PATENT DOCUMENTS

| | | | |
|---|---|---|---|
| 6,615,186 B1* | 9/2003 | Kolls | B60R 25/04 340/988 |
| 6,856,820 B1* | 2/2005 | Kolls | B60R 25/04 455/575.9 |
| 2003/0217002 A1* | 11/2003 | Enborg | G06Q 20/105 705/41 |
| 2004/0236632 A1* | 11/2004 | Maritzen | G06Q 20/28 705/26.1 |
| 2006/0043174 A1 | 3/2006 | Banavar et al. | |
| 2009/0001166 A1 | 1/2009 | Barkan et al. | |
| 2010/0280956 A1 | 11/2010 | Chutorash et al. | |
| 2011/0231310 A1 | 9/2011 | Roberts et al. | |
| 2012/0173314 A1* | 7/2012 | Lee | G06Q 30/0229 705/14.3 |
| 2014/0058805 A1* | 2/2014 | Paesler | G06Q 20/18 705/13 |
| 2015/0058224 A1* | 2/2015 | Gaddam | G07B 15/063 705/44 |

FOREIGN PATENT DOCUMENTS

| | | |
|---|---|---|
| JP | 2004-189149 A | 7/2004 |
| KR | 10-2013-0031997 A | 4/2013 |
| KR | 10-2014-0105072 A | 9/2014 |
| WO | 2009082748 A1 | 7/2009 |

\* cited by examiner

VEHICLE SETTLEMENT SYSTEM AND METHOD

CROSS-REFERENCE TO RELATED APPLICATION

This application claims the benefit of Korean Patent Application No. 10-2016-0119340, filed on Sep. 19, 2016 in the Korean Intellectual Property Office, the disclosure of which is incorporated herein by reference.

BACKGROUND

1. Field

The present disclosure relates to a system and method for making payments from a vehicle.

2. Description of the Related Art

As an environment for paying a fee while operating a vehicle is expanded, a variety of vehicle settlement systems and methods have been proposed.

As a basic vehicle settlement system (or a system for making payments from a vehicle), a method of utilizing a magnetic card, an IC card, or the like has been proposed, and in recent years, there has been an increasing trend to a method of using simple settlement apps built into smartphones. However, through these methods, a user directly transmits a card, a smartphone, or the like to a store, it is inconvenient to easily perform settlement or payment while driving a vehicle or being in a vehicle.

The disclosure of this section is to provide background of the invention. Applicant notes that this section may contain information available before this application. However, by providing this section, Applicant does not admit that any information contained in this section constitutes prior art.

SUMMARY

Therefore, it is an aspect of the present disclosure to provide a vehicle settlement system and method which may transmit settlement authentication information to a financial settlement server rather than a store system when a driver of a vehicle performs settlement inside the vehicle.

It is another aspect of the present disclosure to provide a vehicle settlement system and method which may utilize object recognition information about an object registered in advance as settlement authentication information when a driver of a vehicle performs settlement inside the vehicle.

Additional aspects of the disclosure will be set forth in part in the description which follows and, in part, will be obvious from the description, or may be learned by practice of the disclosure.

In accordance with one aspect of the present disclosure, a vehicle settlement system includes: a vehicle control system; a financial settlement server; and a store system, wherein the vehicle control system includes an object recognition module that is provided to collect object information for settlement authentication, and a vehicle control system control unit that recognizes an object based on the object information collected by the object recognition module.

Here, the vehicle control system may further include a vehicle communication module that is provided to communicate with the financial settlement server and the store system, and the vehicle control system control unit may control the vehicle communication module to transmit object recognition information to the financial settlement server when it is determined that an object registered in advance is recognized based on the object information collected by the object recognition module.

Also, the object recognition module may include an object recognition area on which an object registered in advance is seated, and a collecting unit that collects object recognition information of the object seated on the object recognition area.

Also, the object recognition information may include at least one of weight information and image information of the object seated on the object recognition area.

Also, the vehicle control system may transmit settlement authentication information of a vehicle to the financial settlement server in response to a request of the financial settlement server, the financial settlement server may determine a settlement approval when receiving the settlement authentication information of the vehicle from the vehicle control system, and the store system may determine to provide a product or a service to the vehicle when receiving settlement approval information of the vehicle from the financial settlement server.

Also, the store system may include a vehicle recognition module that is provided to collect vehicle information of a vehicle that enters a store, and a store system control unit that recognizes the vehicle entering the store based on the information collected by the vehicle recognition module.

Also, the store system may further include a store system communication module that is provided to communicate with the financial settlement server and the vehicle.

Also, when the store system receives order information from the vehicle control system, the store system control unit may control the store system communication module to transmit a settlement approval request message to the financial settlement server.

Also, the financial settlement server may request settlement information including the settlement authentication information from the vehicle control system when receiving the settlement approval request message from the store system, and transmit the settlement approval information of the vehicle to the store system when receiving the settlement information including the settlement authentication information from the vehicle control system.

Also, the store system control unit may control the store system communication module to transmit charge information of the store to the vehicle when the vehicle enters the store.

Also, when the vehicle control system receives the charge information of the store from the store system, the vehicle control system control unit may control the vehicle communication module to transmit a settlement request message to the financial settlement server.

Also, the financial settlement server may request the settlement authentication information from the vehicle control system when receiving order and settlement request information from the vehicle control system, and transmit the order information of the vehicle and the settlement approval information of the vehicle to the store system when receiving the settlement authentication information from the vehicle control system.

In accordance with another aspect of the present disclosure, a vehicle settlement method includes: transmitting, by a vehicle control system, settlement authentication information of a vehicle to a financial settlement server in response to a request of the financial settlement server; receiving, by the financial settlement server, the settlement authentication information and determining a settlement approval; and transmitting, by the financial settlement server, settlement approval information of the vehicle to a store system.

Here, the vehicle control system may include an object recognition module that is provided to collect object information for settlement authentication, and in the transmitting of the settlement authentication information of the vehicle, the settlement authentication information of the vehicle may include object recognition information collected by the object recognition module.

Also, the vehicle settlement method may further include receiving, by the store system, order information from the vehicle control system; transmitting, by the store system, a settlement approval request message to the financial settlement server; and requesting, by the financial settlement server, the settlement authentication information from the vehicle control system.

Also, the vehicle settlement method may further include collecting, by the store system, vehicle information about a vehicle when the vehicle enters a store; transmitting, by the store system, charge information of the store to the vehicle control system of the vehicle; and transmitting, by the vehicle control system, a settlement request message to the financial settlement server when receiving the charge information of the store from the store system.

Also, the vehicle settlement method may further include transmitting, by the vehicle control system, order and settlement request information to the financial settlement server; transmitting, by the financial settlement server, a settlement authentication request message to the vehicle control system; transmitting, by the vehicle control system, the settlement authentication information to the financial settlement server; and transmitting, by the financial settlement server, the order information of the vehicle and the settlement approval information of the vehicle to the store system.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, a vehicle settlement system and method (or a system and method for making payments from a vehicle) according to an embodiment of the present invention will be described with reference to the accompanying drawings.

Figure 1:
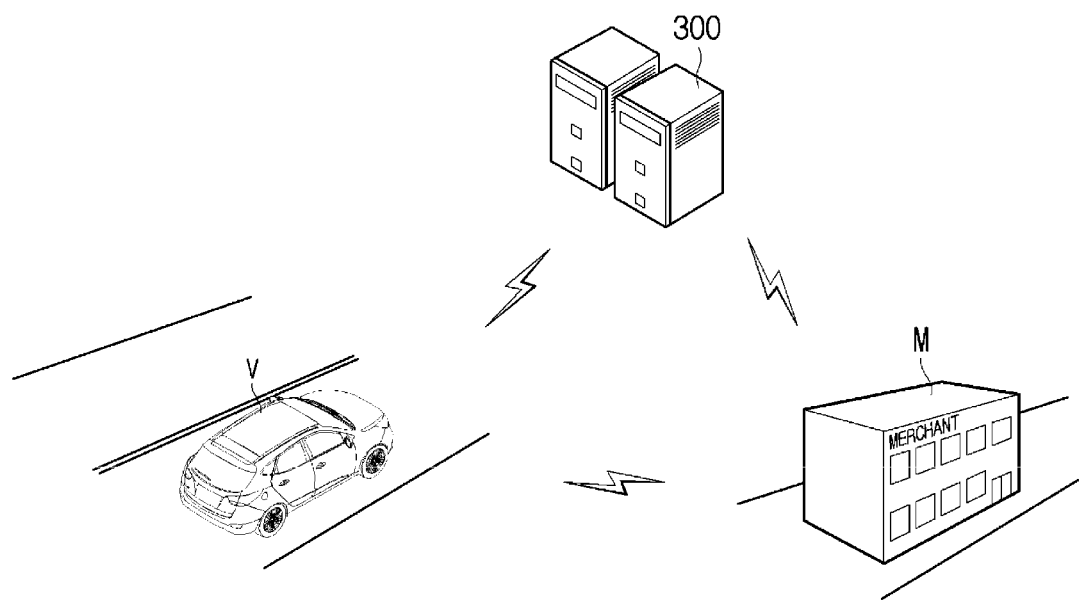
FIG. 1 is a conceptual diagram of a vehicle settlement system according to an embodiment of the present invention.
Figure 2:
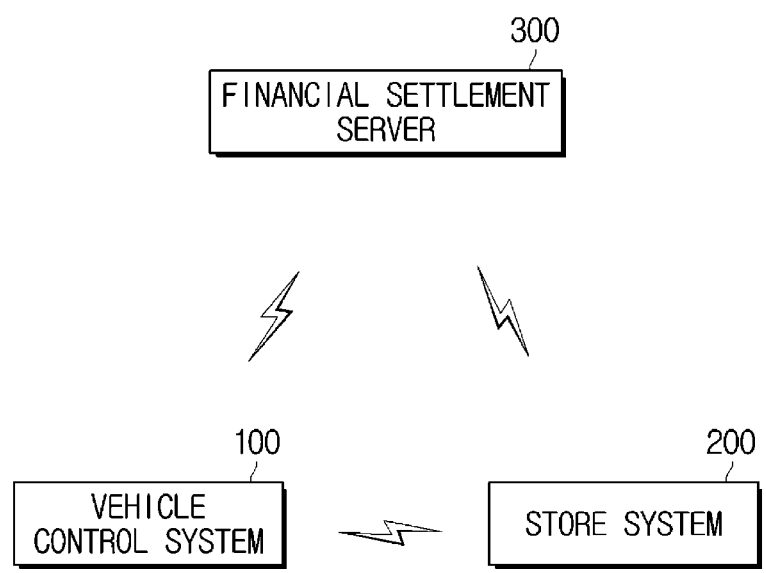
FIG. 2 is a block diagram of a vehicle settlement system according to an embodiment of the present invention.

FIG. 1 is a conceptual diagram of a vehicle settlement system according to an embodiment of the present invention, and FIG. 2 is a block diagram of a vehicle settlement system according to an embodiment of the present invention.

Referring to FIGS. 1 and 2, a vehicle control system or vehicle computer 100 may be installed in a vehicle V. Hereinafter, the vehicle control system 100 is defined as a concept including all devices, circuit configurations, and the like provided in the vehicle V so that a charge settlement is made possible. Such a vehicle control system 100 may be installed in an arbitrary place inside the vehicle V including a steering wheel, a dashboard 111, vehicle seats, a trunk, a rearview mirror, etc., and installed over a plurality of places inside the vehicle V according to an embodiment.

The vehicle control system 100 may be provided to be capable of wireless communication with stores M and a financial settlement server 300 which exist within a predetermined range from a traveling route of the vehicle V in order to provide a more convenient settlement environment to a user.

According to an example, when a user orders a product and performs payment for the ordered product from a specific store M, the vehicle control computer system 100 may provide order information to a store system 200, and provide vehicle information to the store system 200 for versatility and simplicity of settlement according to an embodiment.

In addition, the vehicle control system 100 may provide settlement information including settlement authentication information to the financial settlement server 300. In embodiments of the invention, the vehicle control system 100 may provide the settlement information including settlement authentication information directly to the financial settlement server 300 other than the store computer system 200, thereby protecting the user from a risk of personal information leakage.

Hereinafter, the order information may be information such as a type and the number of a product to be purchased by a user, and the vehicle information may be unique information of the corresponding vehicle V used to distinguish the corresponding vehicle V from other vehicles, for example, information such as a vehicle number, a vehicle model, a vehicle model year, a vehicle color, etc., or mixed information thereof.

In addition, the settlement authentication information may include information required for authenticating settlement such as object recognition information, security card information, authorized certificate information, PIN (personal identification number) code information, and the like, and the settlement information may include information required for performing payment such as charge information of a product or a service, card information, and the like. In addition, the settlement authentication information may include image recognition information about a specific object placed on an object recognition area 102 installed in the vehicle V, and will be described later in the related part.

The financial settlement server or payment processing server 300 may be provided to be capable of wireless communication with the vehicle control system 100 and the store system 200. Hereinafter, the financial settlement server 300 is defined to mean a server provided in a card company, a bank, a securities company, etc. The financial settlement server 300 may receive order and settlement request information, settlement authentication information, and the like from the vehicle control system 100, and transmit a settlement authentication request message to the vehicle control system 100. In addition, the financial settlement server 300 may receive settlement approval request information from the store M, and transmit, to the store server system 200, settlement approval information of the vehicle V, or order information or the like according to an embodiment.

The store system 200 may be provided to be capable of communication with the vehicle control system 100 and the financial settlement server 300. The store system 200 may be installed in an arbitrary place inside the store M, and installed in over a plurality of places inside the store M according to an embodiment.

The store system 200 may transmit a settlement approval request message to the financial settlement server or payment processing computer 300 when receiving order request information about a specific product or service from the vehicle control system 100. In addition, the store system 200 may receive the settlement approval information of the vehicle V from the financial settlement server 300, and receive the settlement approval information together with order information according to an embodiment.

When the vehicle V enters the store M, the store system 200 may collect information of the entered vehicle V, or receive vehicle information, order information, and the like transmitted from the vehicle V. According to an embodiment, when the vehicle V enters a specific store M, the store system 200 may transmit entrance fee information to the vehicle control system 100. Here, the specific store M may be a place where a fee is charged at the entrance, and can be widely understood as a concept including, for example, a car theater, a national park, a parking lot, and the like.

Hereinafter, the configuration of vehicle settlement systems will be described in more detail. First, the configuration of the vehicle control system 100 will be described, and then the configuration of the store system 200 will be described in detail.

Figure 3:
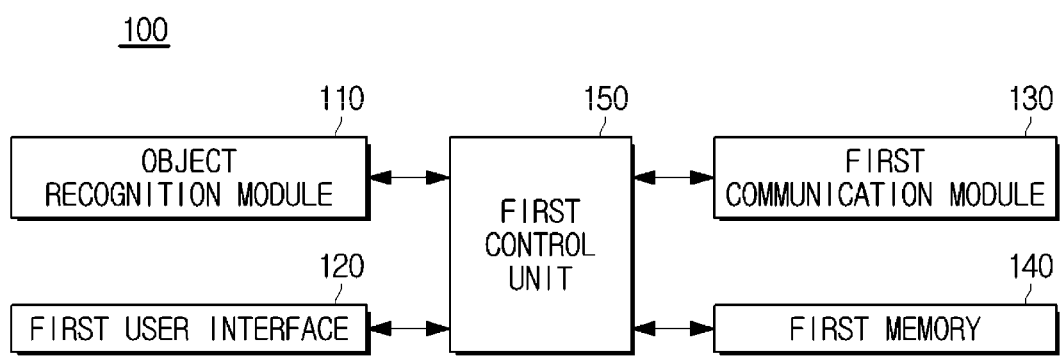
FIG. 3 is a diagram specifically illustrating a control block diagram of a vehicle control system in the vehicle settlement systems of FIGS. 1 and 2.

FIG. 3 is a diagram specifically illustrating a control block diagram of the vehicle control system 100 in the vehicle settlement systems of FIGS. 1 and 2.

Referring to FIG. 3, the vehicle control system 100 may include an object recognition module 110 that collects object information for settlement authentication, a user interface 120 that interacts with a user, a vehicle communication module 130 that performs communication with an external device, a memory 140 that stores data required for operations of the vehicle control system 100, and a vehicle control system control unit 150 that controls the operations of the vehicle control system 100. Hereinafter, in order to distinguish these from control components of the store system 200 which will be described later, the user interface may be referred to as a first user interface 120, the vehicle communication module may be referred to as a first communication module 130, the memory 140 may be referred to as a first memory 140, and the vehicle control system control unit 150 may be referred to as a first control unit 150.

The object recognition module 110 is provided to collect object information for settlement authentication. The object information collected by the object recognition module 110 may be transmitted to the first control unit 150 to be provided to a process for object recognition.

Figure 4:
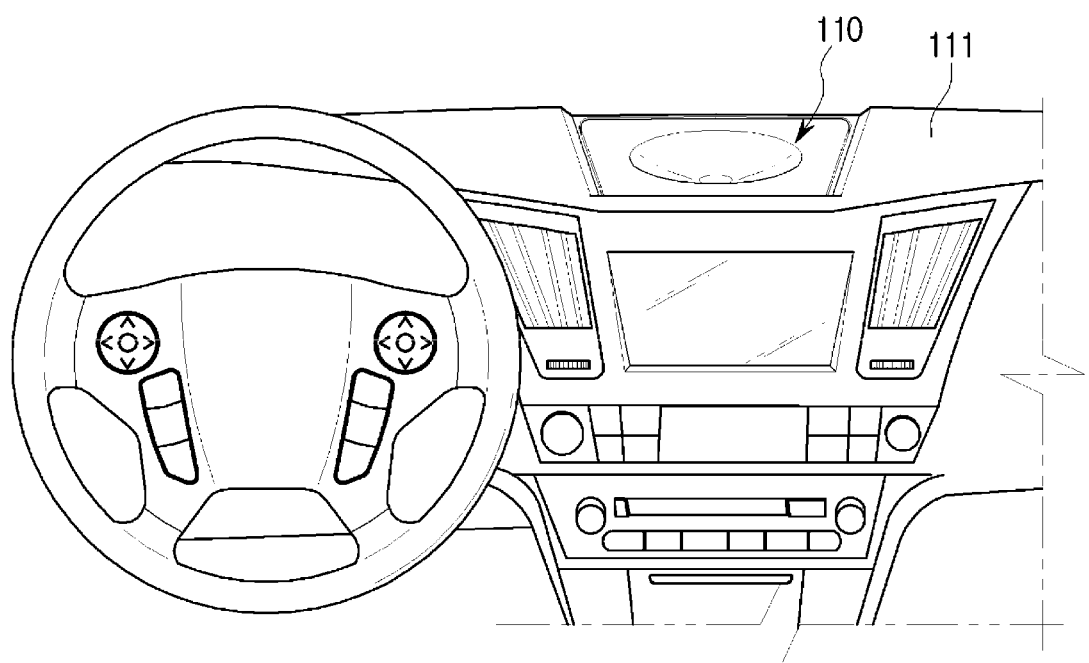
FIG. 4 is a diagram illustrating an example in which an object recognition module is installed in a vehicle.

Hereinafter, the configuration of the object recognition module 110 will be described in more detail with reference to the accompanying drawings. FIG. 4 is a diagram illustrating an example in which the object recognition module 110 is installed in the vehicle V, and FIG. 5 is a diagram illustrating a specific structure of the object recognition module 110.

Figure 5:
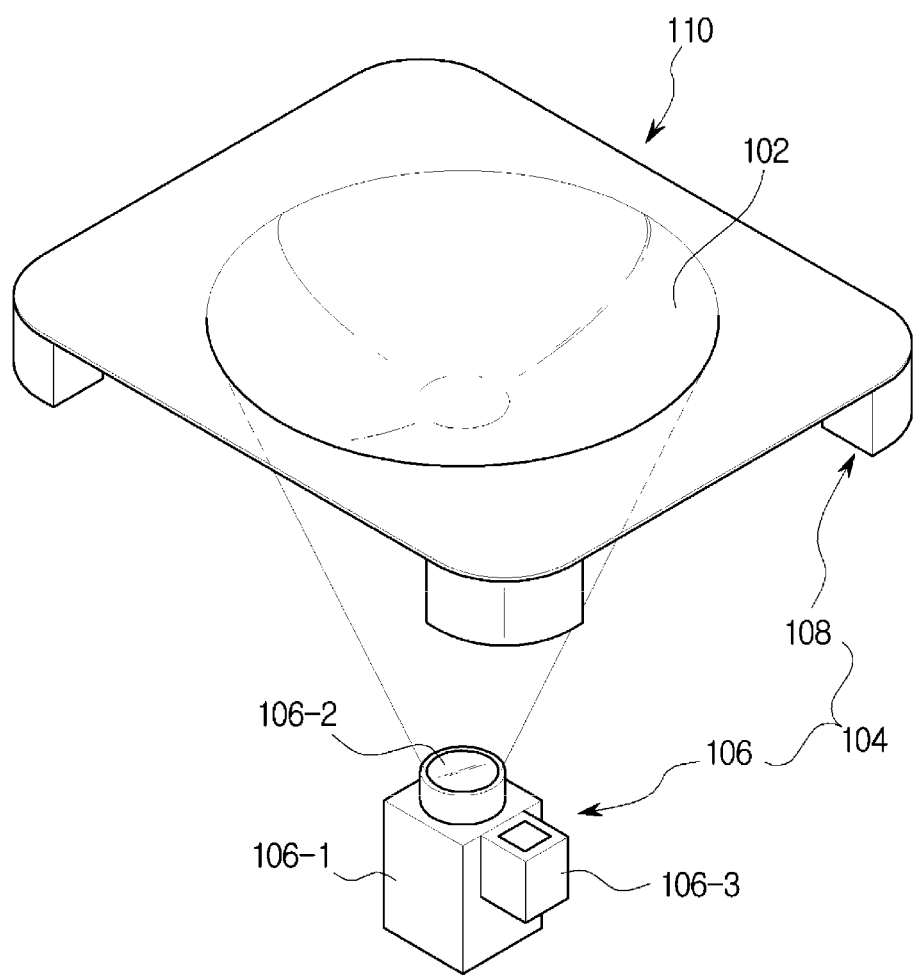
FIG. 5 is a diagram illustrating a specific structure of an object recognition module.

Referring to FIGS. 4 and 5, the object recognition module 110 may include the object recognition area 102 on which an object registered in advance is seated and a collecting unit 104 that is installed at a lower end of the object recognition area 102 and collects object recognition information of the object seated on the object recognition area 102.

The object recognition area 102 may be provided at an upper end of the dashboard 111. More specifically, the object recognition area 102 may be provided in an upper middle area of the dashboard 111. The object recognition area 102 may be an area on which the object registered in advance is seated for settlement authentication when a user wishes to perform settlement inside the vehicle V, and a user authentication process may be performed when the object registered in advance is placed on the object recognition area 102.

Here, the object is a concept including all identifiable physical objects having certain shapes. More specifically, the object may be objects possessed by the user, for example, a wallet W, a mobile device, a card, and the like of the user, and include objects provided inside the vehicle V, for example, a CD, a booklet, a box of tissues, sunglasses, and the like according to an embodiment.

The object recognition area 102 may be provided in a flat form, and provided in a concave form so that an object can be stably seated on the object recognition area 102 according to an embodiment. When the object recognition area 102 is provided in the concave form, the object can be stably seated on the object recognition area 102, and thereby the operation convenience for the user may be improved and the accuracy of object recognition may be improved.

A partial area having a high probability of contact with an object from the object recognition area 102 may be formed of a material having minute projections. As an example, a central region of the object recognition area 102 may be formed of a material having minute projections unlike an edge area thereof. In this manner, by applying, to a partial region of the object recognition area 102, materials different from materials applied to another region thereof, an object can be stably seated on the object recognition area 102, and thereby the user's operation convenience may be improved.

A fixing member for stably seating an object on the object recognition area 102 may be installed in the vicinity of the object recognition area 102. The fixing member may be provided integrally with the object recognition area 102 at an edge of the object recognition area 102, and according to an embodiment, a separate member may be installed at the edge of the object recognition area 102.

Such an object recognition area 102 may be made of a transparent material so that a first collecting unit 106 can easily collect image information of a corresponding object. However, obviously, a member that forms the object recognition area 102 may be made of an opaque material according to the installation position of the first collecting unit 106.

For example, when the first collecting unit 106 is installed at an upper end of the object recognition area 102 unlike shown in FIG. 5, the member that forms the object recognition area 102 may be made of an opaque material.

The collecting unit 104 may collect object information about the object placed on the object recognition area 102. The collecting unit 104 may include the first collecting unit 106 that collects image information of the object placed on the object recognition area 102, and a second collecting unit 108 that collects weight information of the object placed on the object recognition area 102. The first collecting unit 106 and the second collecting unit 108 are both shown in FIG. 5, but according to an embodiment, it is obvious that at least one of the first collecting unit 106 and the second collecting unit 108 may be omitted.

The first collecting unit 106 may collect the image information of the object placed on the object recognition area 102. Such a first collecting unit 106 may be provided at a lower end of the object recognition area 102, in embodiments, at a rear surface of the member that forms the object recognition area 102.

The first collecting unit 106 may include an image collecting section 106-1 that collects image information of an object placed on object recognition area 102, and a light emitting section 106-3 that is disposed adjacent to the image collecting section 106-1 and irradiates light to the object recognition area 102.

The image collecting section 106-1 may be provided in a position suitable for collecting the image information of the object placed on the object recognition area 102. As an example, the image collecting section 106-1 may be provided on the rear surface of the member that forms the object recognition area 102.

The image collecting section 106-1 may be disposed such that an image collecting surface 106-2 of the image collecting section or camera 106-1 faces the object recognition area 102, and more specifically, the image collecting surface 106-2 may be disposed so as to face the central portion of the object recognition area 102, thereby collecting the image information of the object provided on the object recognition area 102. However, the installation position of the image collecting section 106-1 is not limited to the position shown in FIG. 5, and the image collecting section 106-1 may be provided at every position where the image information of the corresponding object can be collected, including a case in which the image collecting surface 106-2 of the image collecting section 106-1 is disposed to face the object recognition area 102. Hereinafter, using the case as an example in which the image collecting section 106-1 is provided on the rear surface of the member that forms the object recognition area 102 as shown in FIG. 5, an embodiment of the present invention will be described in more detail.

In order for the image collecting section 106-1 to smoothly collect an image of the corresponding object, illumination of a certain level or more is provided. In embodiments, when the illumination of an area where image collection is performed is not secured at a certain level or more, it may be difficult to acquire size, shape, color information, and the like of the corresponding object required for recognizing the object from the image acquired by the image collecting section 106-1.

As an example, when an object is located in the object recognition area 102, light directed to the rear surface of the object recognition area 102 may be interrupted so that image collection by the image collecting section 106-1 may be difficult, and it may be difficult for the image collecting section 106-1 to collect the image even when an illumination environment around a corresponding vehicle V is poor, such as when the vehicle V enters a tunnel or when the vehicle V runs on the road at night.

In consideration of this, the light emitting section 106-3 may be installed around the image collecting section 106-1. The light emitting section 106-3 may irradiate light to an area where image collection is performed by the image collecting section 106-1, in embodiments, to the vicinity of the object recognition area 102 of an input device, so that the image collecting section 106-1 can smoothly collect the image of the object.

According to an embodiment, an illumination sensor may be installed around the object recognition area 102, and the light emitting section 106-3 may irradiate the vicinity of the object recognition area 102 with light with intensity optimized for recognizing the object based on illumination information detected by the illumination sensor.

The second collecting unit 108 may collect the weight information of the corresponding object provided on the object recognition area 102. Such a second collecting unit 108 may be provided at a lower end of the member that forms the object recognition area 102, in embodiments, on the rear surface of the member that forms the object recognition area 102.

The second collecting unit 108 may include at least one load cell that is provided to be capable of collecting the weight information of the object. The load cell may be a force detector using a strain gauge, and include a compression type load cell, a tension type load cell, and a compression and tension combined type load cell according to an embodiment. However, examples of the second collecting unit 108 are not limited thereto, and the second collecting unit 108 should be broadly understood as a concept including all components provided to be capable of collecting the weight information of the object.

The load cell may be disposed at a position where it is easy to collect the weight information of the object provided on the object recognition area 102, and may be provided singly or in plurality, as necessary. When the load cell is provided in plurality, the plurality of load cells may be arranged at regular intervals at edges of the rear surface of the member that forms the object recognition area 102. According to an embodiment, when the first collecting unit 106 is not provided, a single load cell may be disposed in a central portion of the rear surface of the member that forms the object recognition area 102.

The first user interface 120 may acquire a user's control command, and display operation information of a vehicle control device. The first user interface 120 may include a power button for turning on/off a power source, an input button for receiving the user's control command, and the like, and include an LCD (liquid crystal display), an LED (light emitting diode), an OLED (organic light emitting diode), a QD (quantum dot display), or the like, which is used for displaying the operating state of the vehicle control system 100. As an example, the user interface may be a concept including an AVN device installed in the vehicle V.

The first communication module 130 transmits and receives a variety of signals and data to and from the financial settlement server 300 and the store system 200 through wireless communication. As an example, the first communication module 130 may transmit vehicle information, order request information, and the like to the store system 200 through wireless communication, and receive charge information from the store system 200. In addition, the first communication module 130 may transmit vehicle information, order request information, decision request information, settlement authentication information, and the like to the financial settlement server 300 through wireless communication, and receive a settlement authentication request message or the like from the financial settlement server 300.

Such a first communication module 130 may include various communication modules such as a wireless Internet module, a short-range communication module, a mobile communication module, and the like.

The wireless Internet module refers to a module that is connected to an external network to perform communication according to a communication protocol such as WLAN (wireless LAN), Wi-Fi, Wibro (wireless broadband), Wimax (world interoperability for microwave access), HSDPA (high speed downlink packet access), or the like.

The short-range communication module refers to a module for performing communication with an external device located in a short distance according to a short-range communication method such as Bluetooth, RFID (radio frequency identification), IrDA (infrared data association), UWB (ultra wideband), Zigbee, or the like.

The mobile communication module refers to a module that is connected to a mobile communication network to perform communication according to a variety of mobile communication standards such as 3G (3rd generation), 3GPP (3rd generation partnership project), LTE (long term evolution), or the like.

However, the examples of the first communication module 130 are not limited thereto, and obviously, another type of communication module or a combination type of communication module of the above-described examples may be adopted.

The first memory 140 may temporarily or non-temporarily store data and programs for operations of the vehicle control system 100. For example, the first memory 140 may store object information registered in advance in order to perform settlement authentication, object recognition information collected by the object recognition module 110, charge information collected by the communication module, and the like. The object information or the like stored in the first memory 140 may be transmitted to the first control unit 150 in response to a request of the first control unit 150, and provided to an object recognition process for settlement authentication.

Such a first memory 140 may include at least one type of storage medium among a flash memory type, a hard disk type, a multimedia card micro type, and a card type of memory (for example, SD or XD memory), a RAM (random access memory), an SRAM (static random access memory), a ROM (read-only memory), an EEPROM (electrically erasable programmable read-only memory), a PROM (programmable read-only memory), a magnetic memory, a magnetic disk, and an optical disk. However, the first memory 140 is not limited thereto, and may be implemented in various types known to those skilled in the art.

The first control unit 150 controls overall operations of the vehicle control system 100. The first control unit 150 may control respective components of the vehicle control system 100, in embodiments, the object recognition module 110, the first user interface 120, the first communication module 130, the first memory 140, and the like. The first control unit 150 may include various processors including at least one chip in which an integrated circuit is formed. The control of the vehicle control system 100 will be described later in detail.

Figure 6:
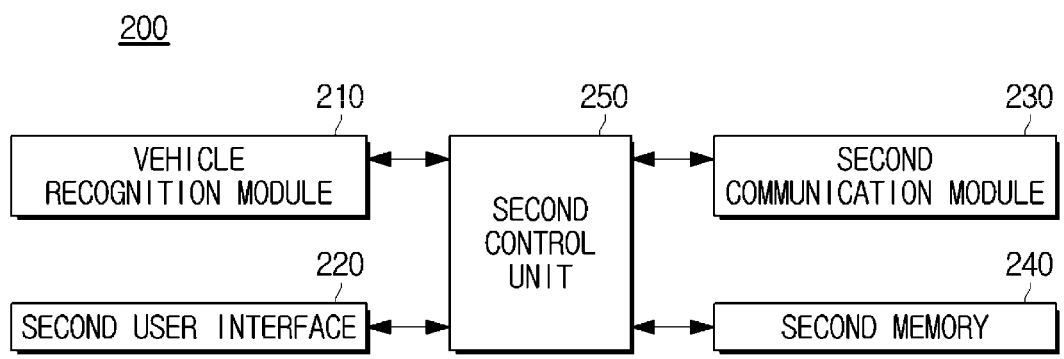
FIG. 6 is a diagram specifically illustrating a control block diagram of a store system in the vehicle settlement systems of FIGS. 1 and 2.

FIG. 6 is a diagram specifically illustrating a control block diagram of the store system 200 in the vehicle settlement systems of FIGS. 1 and 2.

Referring to FIG. 6, the store system 200 may include a vehicle recognition module 210 that collects vehicle information about a vehicle that enters a store M, a user interface 220 that interacts with a user, a store system communication module 230 that performs communication with an external device, a memory 240 that stores data required for operations of the store system 200, and a store system control unit 250 that controls overall operations of the store system 200. Hereinafter, in order to distinguish these from the above-described control components of the vehicle control system 100, the user interface 220 may be referred to as a second user interface 220, the store system communication module 230 may be referred to as a second communication module 230, the memory 240 may be referred to as a second memory 240, and the store system control unit 250 may be referred to as a second control unit 250.

The vehicle recognition module 210 may collect the vehicle information about the vehicle that enters the store M. Such a vehicle recognition module 210 may include an image collecting unit such as a camera, and include an optical sensor, a weight sensor, or the like according to an embodiment. Assuming that a camera is used as the vehicle recognition module 210, when the vehicle V enters the store M, the camera may collect a license plate image of the vehicle V, and transmit the collected image to the second control unit 250. The second control unit 250 may recognize the vehicle V that enters the store M based on the license plate image information of the vehicle V received from the camera.

The second user interface 220 may acquire a user's control command, and display vehicle information, order information, or the like about the vehicle V that enters the store M through the store system 200. The second user interface 220 may include a power button for turning on/off a power source, an input button for receiving the user's control command, and the like, and include an LCD or the like for displaying the operating state of the store system 200. Hereinafter, a description of the second user interface 220 overlapping with the first user interface 120 described above will be omitted.

The second communication module 230 transmits and receives a variety of signals and data to and from the vehicle control system 100 and the financial settlement server 300 through wireless communication. As an example, the second communication module 230 may receive order information from the vehicle control system 100 through wireless communication, and transmit an electrical signal for indicating completion of a charge settlement to the vehicle control system 100 when a settlement process is completed. In addition, the second communication module 230 may transmit settlement approval request information to the financial settlement server 300 through wireless communication, and receive settlement approval information of the vehicle V from the financial settlement server 300. A description of the kind of the second communication module 230 overlapping with the first communication module 130 described above will be omitted.

The second memory 240 may temporarily or non-temporarily store data and programs for operations of the store system 200. For example, the second memory 240 may store vehicle recognition information collected by the vehicle recognition module 210, order information received from the first communication module 130, settlement approval information of the vehicle V received from the financial settlement server 300, and the like. The information stored in the second memory 240 may be transmitted to the second control unit 250 in response to a request of the second control unit 250, and provided to a process for confirming settlement approval information of the vehicle V. A description of the kind of the second memory 240 overlapping with the first memory 140 described above will be omitted.

The second control unit 250 controls overall operations of the store system 200. The second control unit 250 may control respective components of the store system 200, in embodiments, the vehicle recognition module 210, the second user interface 220, the second communication module 230, the second memory 240, and the like. The second control unit 250 may include various processors including at least one chip in which an integrated circuit is formed. The control of the store system 200 will be described later in more detail in an embodiment which will be described later, together with the above-described control of the vehicle control system 100.

As above, the respective components of the vehicle settlement system (or the system and method for making payments from a vehicle) have been described. Hereinafter, a method in which the vehicle settlement system is operated, that is, a vehicle settlement method will be described.

In the vehicle settlement method according to embodiments of the disclosed invention, settlement authentication may be performed with respect to an object registered in advance, thereby providing a personalization function of a settlement authentication means to a user while providing convenience of settlement to the user. In addition, the user can arbitrarily and frequently change an object for settlement authentication, thereby providing high security.

Hereinafter, before describing an embodiment of the vehicle settlement method, a process for registering an object for settlement authentication will be briefly described in order to facilitate understanding. Meanwhile, a process for changing the registered object into another object for the purpose of settlement authentication may be performed in the same manner as that of a process for registering an object, and a description overlapping with the process for registering the object which will be descried later will be omitted.

Figure 7:
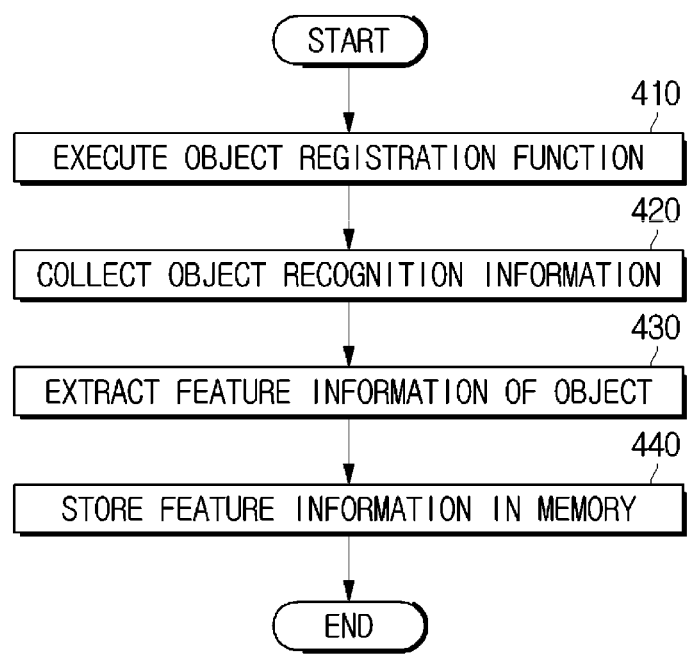
FIG. 7 is a diagram illustrating an example of a process for registering an object for the purpose of settlement authentication.
Figure 8:
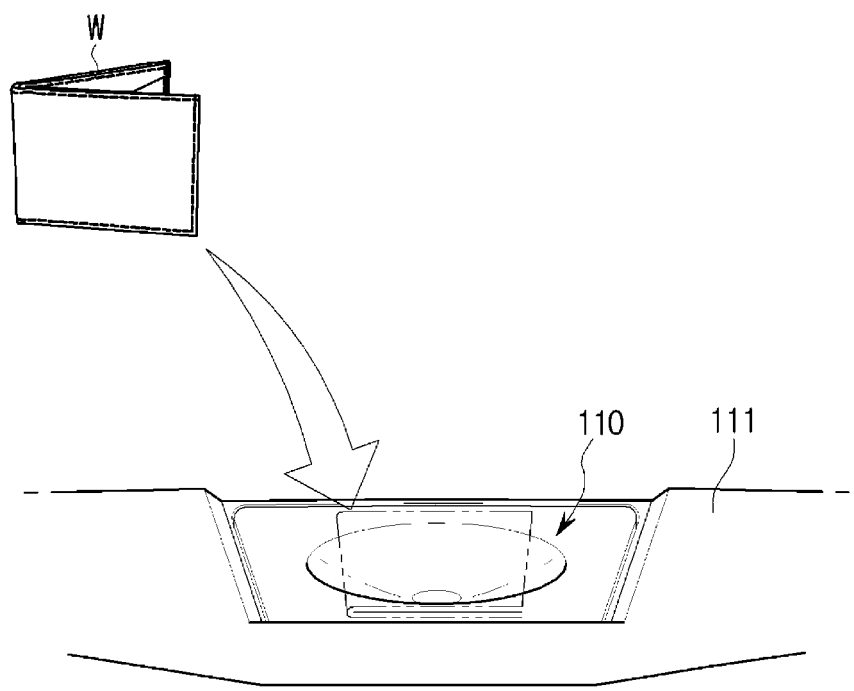
FIG. 8 is a diagram illustrating an example of a process for registering a wallet as an object for the purpose of settlement authentication.

FIG. 7 is a diagram illustrating an example of a process for registering an object for the purpose of settlement authentication, and FIG. 8 is a diagram illustrating an example of a process for registering a wallet as an object for the purpose of settlement authentication.

Referring to FIG. 7, the process for registering an object for the purpose of settlement authentication may include operation 410 of executing an object registration function for settlement authentication, operation 420 of collecting object recognition information of an object placed on the object recognition area 102, operation 430 of extracting feature information of the object from the collected object recognition information, and operation 440 of storing the extracted feature information of the object in a memory, which are performed in the vehicle control system 100.

First, in operation 410, a user may execute the object registration function for settlement authentication in the vehicle control system 100 through the first user interface 120, for example, an AVN device. According to an embodiment, the object registration function may be executed by a method such as voice recognition.

When the object registration function for settlement authentication is executed, a screen informing that the object registration function has been executed may be provided to a display of the AVN device. A message for instructing to place an object desired to be registered on the object recognition area 102 may be provided to the screen.

When the object registration function is executed, the user may place the object desired to be registered on the object recognition area 102. In FIG. 8, a case in which a wallet W is placed on the object recognition area is shown, but the example of the object that can be registered is not limited to the example of FIG. 8.

The collecting unit 104 of the object recognition module 110 may collect object recognition information about the wallet W placed on the object recognition area 102, and transmit the collected object recognition information to the first control unit 150 in operation 420. For example, the first collecting unit 106 may collect image information of the wallet W placed on the object recognition area 102 and transmit the collected image information to the first control unit 150, and the second collecting unit 108 may collect weight information of the wallet W placed on the object recognition area 102 and transmit the collected weight information to the first control unit 150.

Next, in operations 430 and 440, the first control unit 150 may extract feature information of the wallet W from the object recognition information collected by the collecting unit 104, and store the extracted feature information of the object in the first memory 140.

For example, the first control unit 150 may provide the image information of the wallet W collected by the first collecting unit 106 to an image processing process, and extract feature point information of the wallet W based on the provided image information. As another example, the first control unit 150 may set an error range based on the weight information of the wallet W collected by the second collecting unit 108. Next, the first control unit 150 may store the extracted feature point information, the weight information, the set error range, and the like in the first memory 140.

Through this process, it is possible to register an object for settlement authentication and change the registered object, and based on this, a charge settlement process by a vehicle settlement system will be herein described in more detail.

Figure 9:
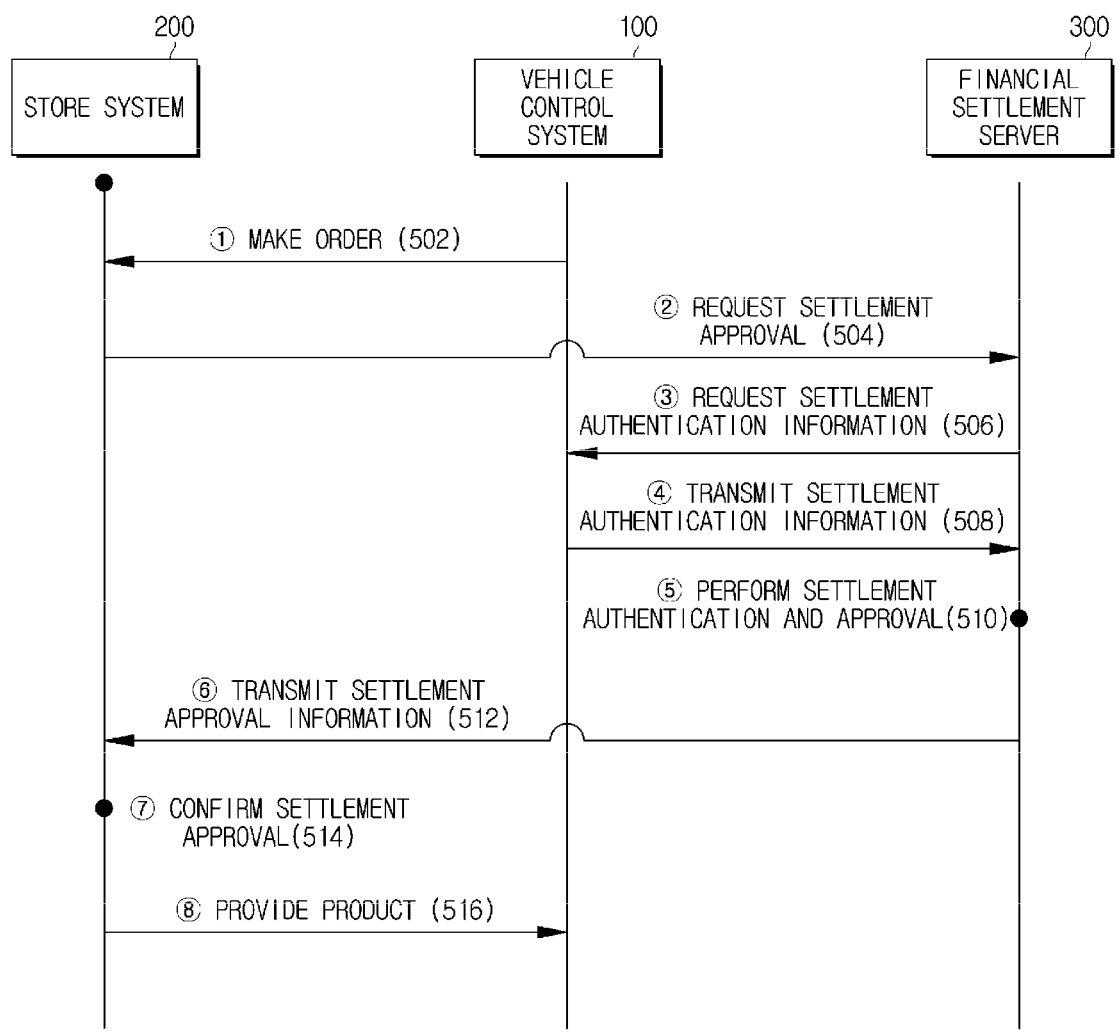
FIGS. 9 and 10 are diagrams illustrating an example of a charge settlement process by a vehicle settlement system according to an embodiment of the present invention.
Figure 10:
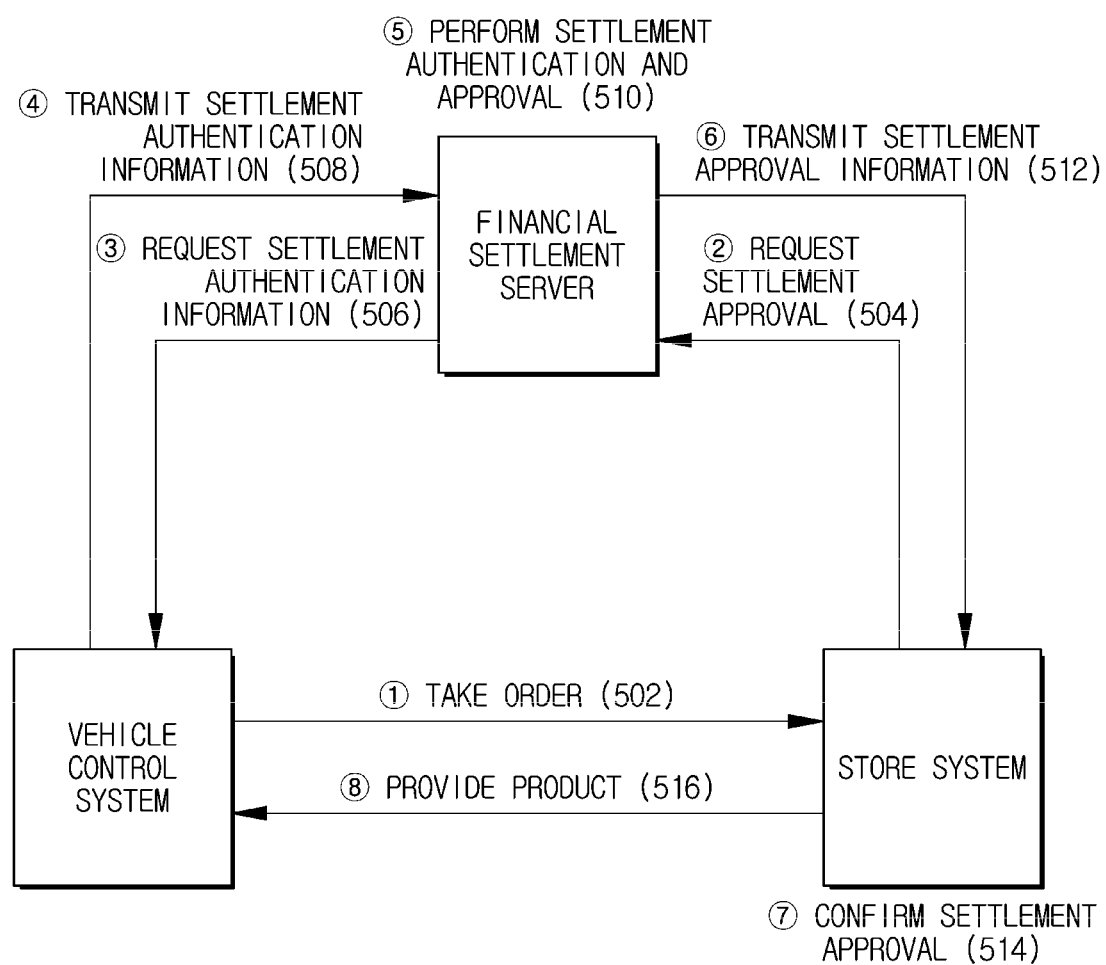

FIGS. 9 and 10 are diagrams illustrating an example of a charge settlement process by a vehicle settlement system according to an embodiment of the present invention.

Referring to FIGS. 9 and 10, the vehicle settlement method according to an embodiment may include operation 502 of receiving, by the store system 200, order information from the vehicle control system 100, operation 504 of transmitting, by the store system 200, a settlement approval request message to the financial settlement server 300, operation 506 of requesting, by the financial settlement server 300, settlement authentication information from the vehicle control system 100, operation 508 of transmitting settlement authentication information of a vehicle to the financial settlement server 300 in response to the request of the financial settlement server 300, operation 510 of determining, by the financial settlement server 300, settlement approval when the settlement authentication information is received and settlement is authenticated, operation 512 of transmitting, by the financial settlement server 300, settlement approval information of the vehicle to the store system 200, and operation 514 of confirming, by the store system 200, a settlement approval.

Specifically, first, in operation 502, the store system 200 may receive the order information from the vehicle control system 100. A user may order a product or a service through an AVN device provided inside the vehicle or an app stored in a portable terminal carried by the user, and the order information may be transmitted to the store system 200 in a wireless communication method.

In operation 504, when the order information of the customer is confirmed in the store system 200, the store system 200 may transmit a settlement approval request message to the financial settlement server 300. In operation 506, when receiving the settlement approval request message from the store system 200, the financial settlement server 300 may request settlement authentication information from the vehicle control system 100.

In operation 506, the vehicle control system 100 may transmit the settlement authentication information of the vehicle to the financial settlement server 300 in response to the request of the financial settlement server 300. For example, when the vehicle control system 100 receives a request for the settlement authentication information from the financial settlement server 300, a settlement authentication request message may be provided to the AVN device of the vehicle V. In this case, the user may perform a settlement authentication by placing an object registered in advance on the object recognition area 102. The object information collected through the object recognition module 110 may be transmitted to the first control unit 150, and the first control unit 150 may control the first communication module 130 to transmit the settlement authentication information to the financial settlement server 300.

In operation 510, when receiving the settlement authentication information from the vehicle control system 100, the financial settlement server 300 may determine whether a settlement authentication and a settlement approval are performed. When the settlement authentication information transmitted from the vehicle control system 100 coincides with the settlement authentication information registered in advance, the financial settlement server 300 may confirm the authentication and approval of settlement, and transmit the settlement approval information of the vehicle V to the store system 200.

In operations 512 and 514, the store system 200 may receive the settlement approval information from the financial settlement server 300, and confirm the settlement approval based on the received information. In operation 516, when the settlement approval is confirmed, the store system 200 may provide a product or a service to the customer.

Figure 11:
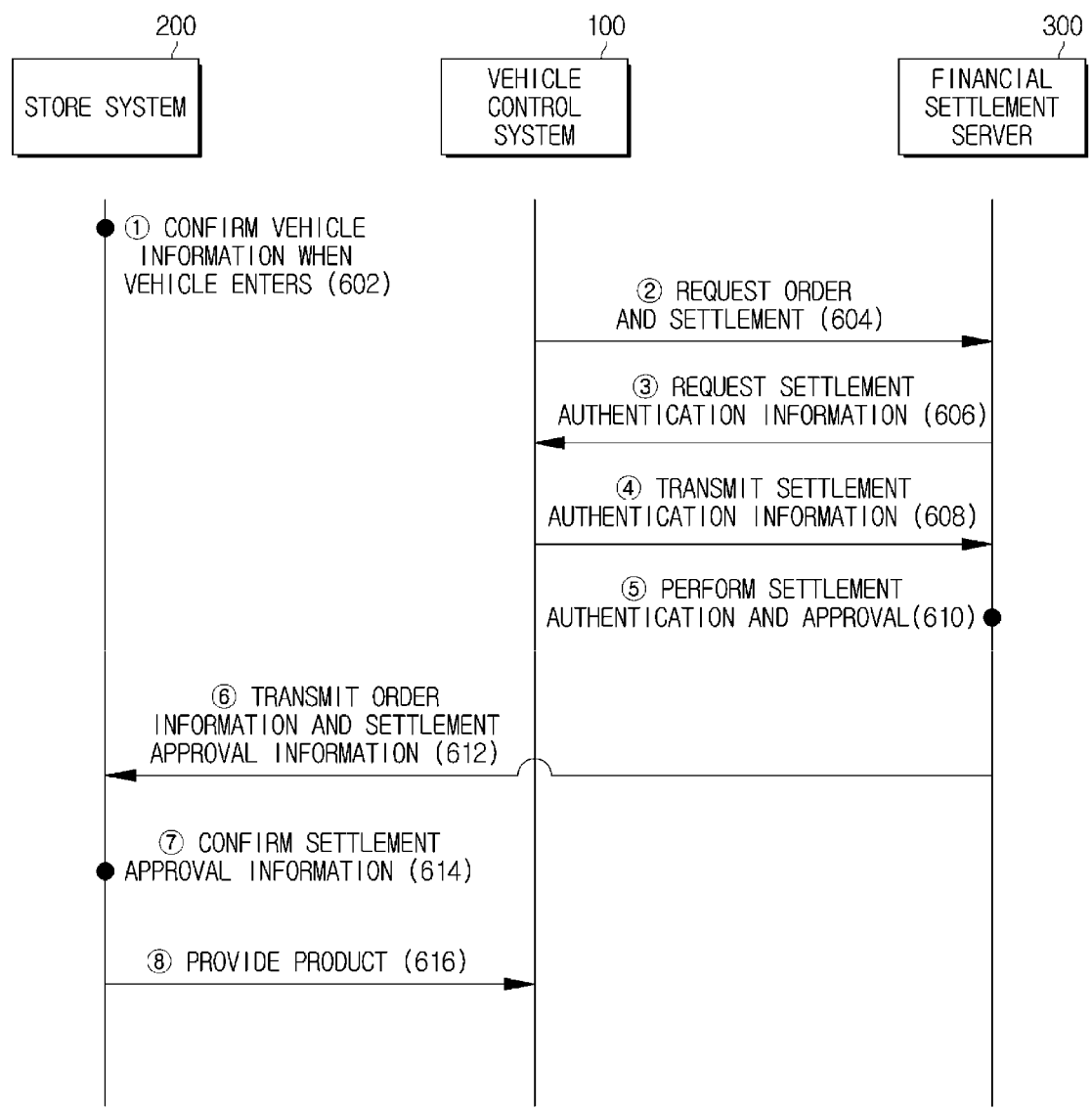
FIGS. 11 and 12 are diagrams illustrating an example of a charge settlement process by a vehicle settlement system according to another embodiment of the present invention.
Figure 12:
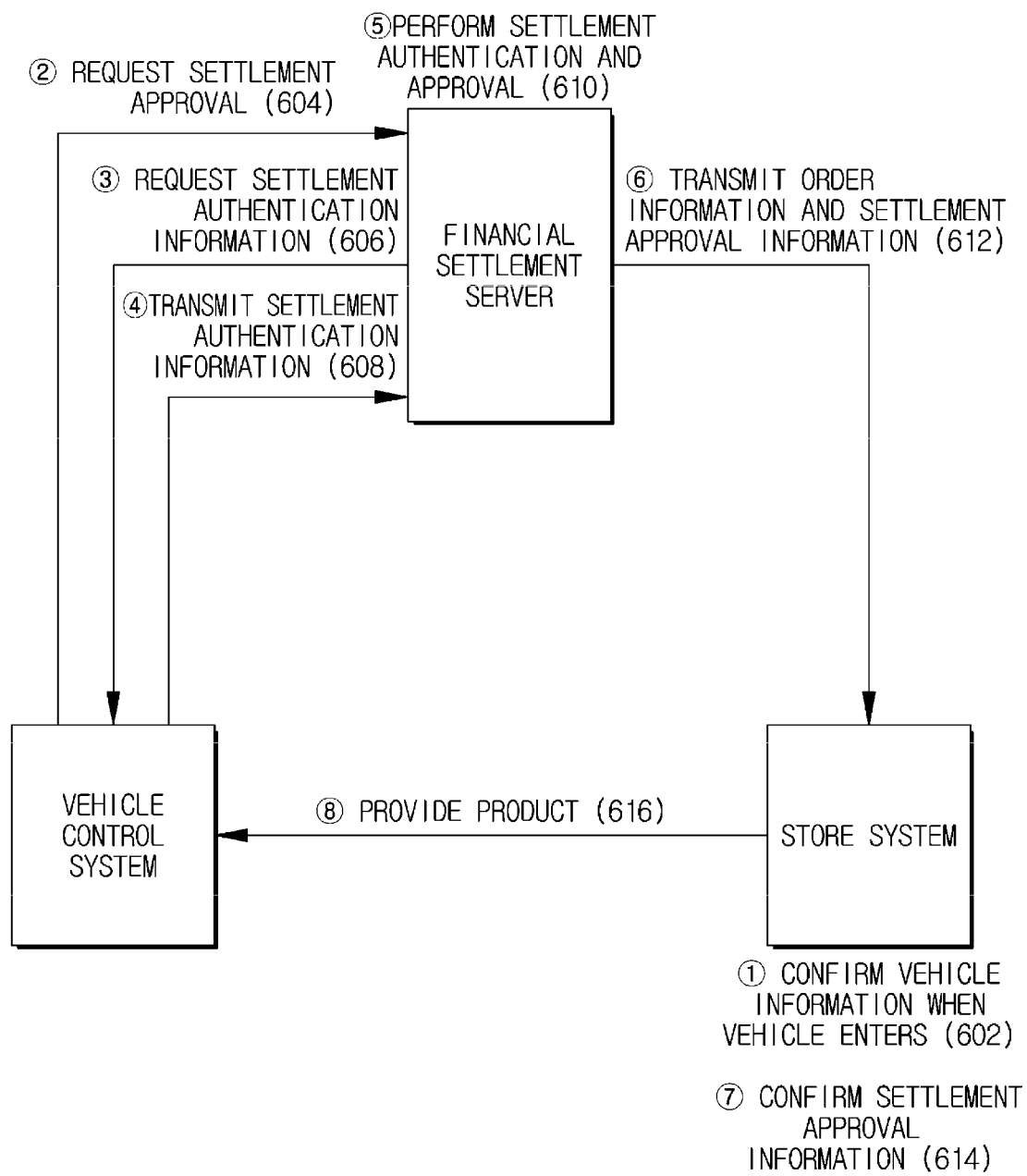

FIGS. 11 and 12 are diagrams illustrating an example of a charge settlement process by a vehicle settlement system according to another embodiment of the present invention.

Referring to FIGS. 11 and 12, a vehicle settlement method according to an embodiment may include operation 602 of confirming, by the store system 200, vehicle information about a vehicle V that enters a store M when the vehicle V enters the store M, operation 604 of receiving, by the financial settlement server 300, an order and settlement request message from the vehicle control system 100, operation 606 of requesting, by the financial settlement server 300, settlement authentication information from the vehicle control system 100, operation 608 of transmitting, by the vehicle control system 100, the settlement authentication information of the vehicle V to the financial settlement server 300 in response to the request of the financial settlement server 300, operation 610 of determining, by the financial settlement server 300, a settlement approval when the settlement authentication information is received and settlement is authenticated, operation 612 of transmitting, by the financial settlement server 300, order information of the vehicle V and settlement approval information of the vehicle V to the store system 200, and operation 614 of confirming, by the store system 200, a settlement approval.

Specifically, first, in operation 602, when the vehicle V enters the store M, the store system 200 may confirm the vehicle information about the vehicle V that enters the store M. As an example, when the vehicle V enters the store M, the vehicle recognition module 210 of the store system 200 may collect a license plate image of the entered vehicle V, and recognize information about the vehicle V based on the collected license plate image. The recognized information may be provided to a vehicle settlement process which will be described later.

Next, in operation 604, the financial settlement server 300 may receive the order and settlement request information from the vehicle control system 100. A user may order a required product or service through an AVN device provided inside the vehicle V or an app stored in a portable terminal carried by the user, and the order information may be transmitted to the financial settlement server 300 in a wireless communication method. In a case of the present embodiment, the order information may be transmitted directly to the financial settlement server 300 other than the store system 200, unlike the case of FIGS. 8 and 9. Through this method, when compared to the case of FIGS. 8 and 9, the operations for settlement may be simplified and made efficient.

In operation 606, when receiving the order and settlement request information from the vehicle control system 100, the financial settlement server 300 may request settlement authentication information from the vehicle control system 100.

In operation 608, the vehicle control system 100 may transmit the settlement authentication information of the vehicle V to the financial settlement server 300 in response to the request of the financial settlement server 300. As an example, a driver of the vehicle may create the settlement authentication information of the vehicle V by placing an object registered in advance on the object recognition area 102 of the object recognition module 110. The object recognition module 110 may create the settlement authentication information based on object recognition information, and transmit the created information to the financial settlement server 300. Hereinafter, a description of the settlement authentication process using an object overlapping with the descriptions made in FIGS. 9 and 10 will be omitted.

In operation 610, when receiving the settlement authentication information, the financial settlement server 300 may determine whether a settlement authentication and a settlement approval are performed. When the settlement authentication information transmitted from the vehicle control system 100 coincides with the settlement authentication information registered in advance, the financial settlement server 300 may determine the authentication and approval of settlement.

Next, in operation 612, the financial settlement server 300 may transmit, to the store system 200, settlement approval information together with the order information received from the vehicle control system 100.

In operations 614 and 616, the store system 200 may confirm the settlement approval information from the financial settlement server 300, and provide a product or a service to a customer.

By applying the above-described vehicle settlement methods to the vehicle V, when a driver of the vehicle V desires to purchase a product or a service in the store M where the driver frequently drops by and purchases a product or a service (for example, a convenience store, a mart, a gas station, a store where a user can purchase a simple clothing, or the like) including a driving-through store, order and settlement may be simply performed inside the vehicle V, thereby improving a user's convenience.

Figure 13:
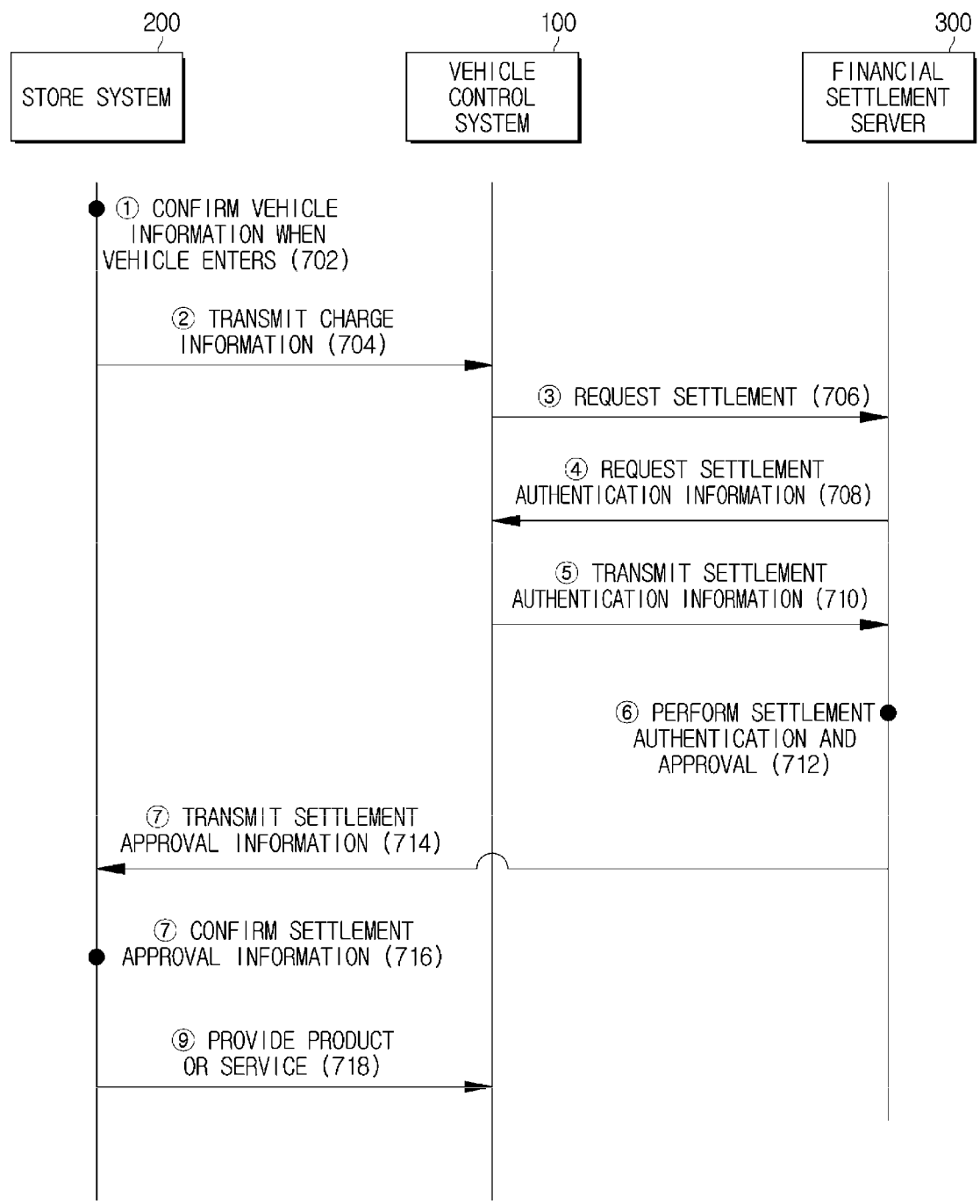
FIGS. 13 and 14 are diagrams illustrating an example of a charge settlement process by a vehicle settlement system according to another embodiment of the present invention.
Figure 14:
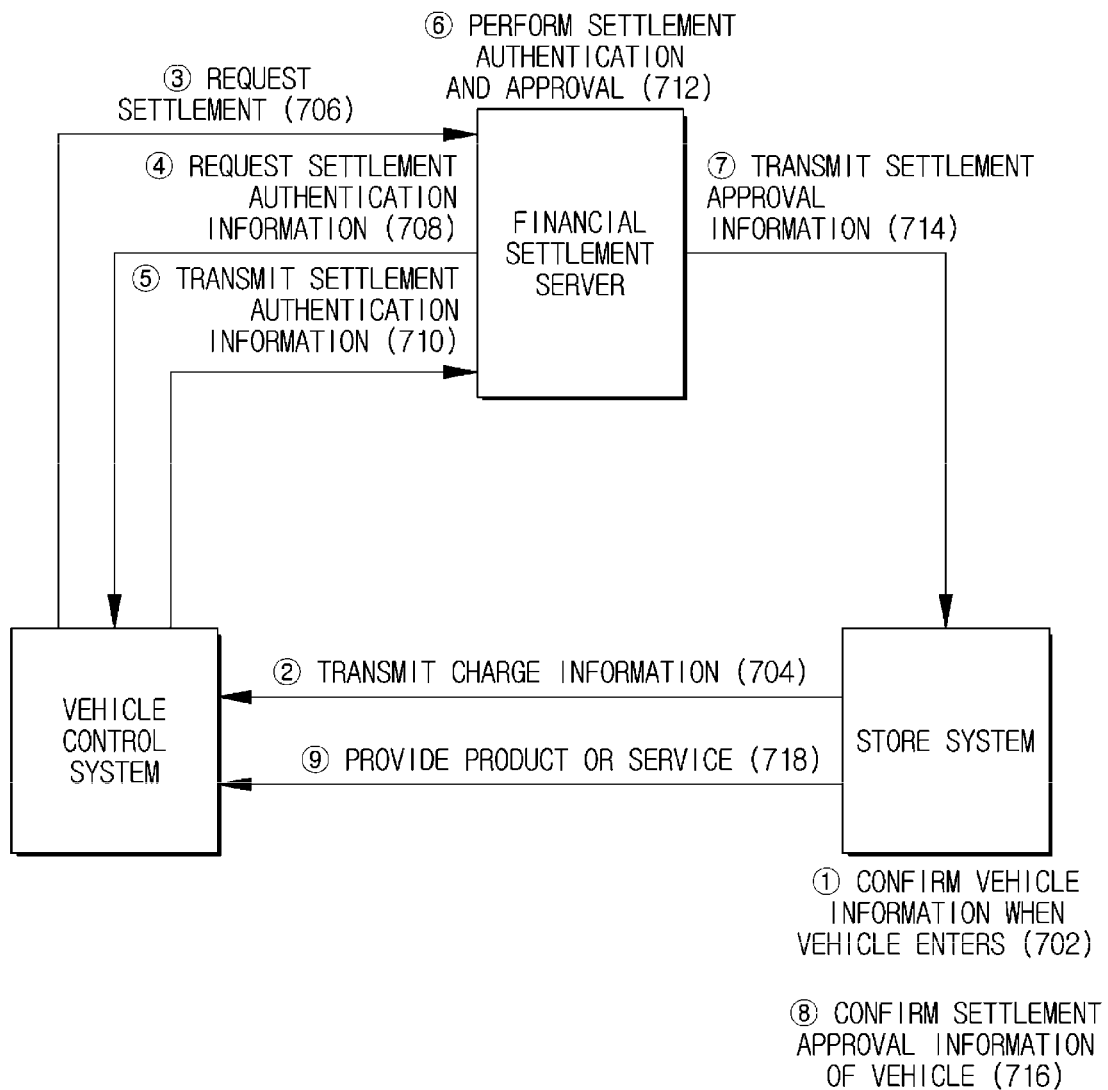

FIGS. 13 and 14 are diagrams illustrating an example of a charge settlement process by a vehicle settlement system according to another embodiment of the present invention.

Referring to FIGS. 13 and 14, a vehicle settlement method according to an embodiment may include operation 702 of confirming, by the store system 200, vehicle information of a vehicle V when the vehicle V enters a store M, operation 704 of transmitting, by the store system 200, charge information to the vehicle control system 100 of the confirmed vehicle V, operation 706 of transmitting, by the vehicle control system 100, a settlement request message to the financial settlement server 300, operation 708 of requesting, by the financial settlement server 300, settlement authentication information from the vehicle control system 100, operation 710 of transmitting, by the vehicle control system 100, the settlement authentication information of the vehicle V to the financial settlement server 300 in response to the request of the financial settlement server 300, operation 712 of determining, by the financial settlement server 300, a settlement approval when the settlement authentication information is received and settlement is authenticated, operation 714 of transmitting, by the financial settlement server 300, settlement approval information of the vehicle V to the store system 200, and operation 716 of confirming, by the store system 200, a settlement approval.

Specifically, first, in operation 702, when the vehicle V enters the store M, the store system 200 may confirm the vehicle information about the entered vehicle V. A description of the operation of confirming the vehicle information about the entered vehicle V overlapping with the above-description will be omitted.

Next, in operation 704, the store system 200 may transmit the charge information to the vehicle control system 100 of the confirmed vehicle V. By applying the present embodiment to an environment in which an entrance fee or a usage fee for a specific place is paid according to a predetermined rule, it is possible to simplify the settlement process. As an example, by applying the present embodiment to an environment in which a fee for a specific place such as a car theater, a tourist attraction, a parking lot, or the like is paid, it is possible to improve a user's convenience.

In the present embodiment, a vehicle passenger can confirm the charge information transmitted from the store system 200 through a display of an AVN device. Here, the charge information may include charge information for use time, charge and discount information about people who use specific services, and the like. In this case, a user can proceed with a charge settlement process for a service desired to be used by the user by clicking a charge settlement button provided on the display of the AVN device.

In operation 706, when a charge settlement command for a specific service is input by a user, the vehicle control system 100 may transmit a settlement request message to the financial settlement server 300. In operation 708, when receiving the settlement request message from the vehicle control system 100, the financial settlement server 300 may request the settlement authentication information from the vehicle control system 100.

In operation 710, the vehicle control system 100 may transmit the settlement authentication information of the vehicle V to the financial settlement server 300 in response to the request of the financial settlement server 300. Hereinafter, a description of a process in which the vehicle control system 100 creates the settlement authentication information using an object registered in advance overlapping with the above-description will be omitted.

In operation 712, when receiving the settlement authentication information from the vehicle control system 100, the financial settlement server 300 may determine whether a settlement authentication and a settlement approval are performed. In operation 714, when the settlement authentication information transmitted from the vehicle control system 100 coincides with the settlement authentication information registered in advance, the financial settlement server 300 may confirm the authentication and approval of settlement, and transmit the settlement approval information of the vehicle V to the store system 200.

In operations 716 and 718, the store system 200 may confirm the settlement approval information from the financial settlement server 300, and provide a product or a service to the customer.

Referring to FIGS. 2, 9 and 10, embodiments provide a method of performing a transaction while a buyer is in a vehicle. When the vehicle drives into a store, a store computer system 200 recognizes the vehicle's license plate for using it as the vehicle identification. When the buyer orders a buying item (which can be a product or a service), the store computer 200 generates an order number and sends it along with the vehicle identification to a financial settlement server (or a payment server) via a data communication network. Subsequently, the financial settlement server 300 sends a request for authorizing payment to the vehicle computer 100 based on the vehicle identification via a wireless data communication network. In response, the vehicle's computer 100 sends authorization information to the financial settlement server 300 via the wireless data communication network. Subsequently, the financial settlement server 300 sends transaction approval information including the vehicle identification and the order number to the store computer 300. Then, the store computer 200 determines if either one or both of the vehicle identification and the order number match with those stored in the store computer 200 for finalizing the transaction.

Referring to FIGS. 2, 11 and 12, embodiments provide a method of performing a transaction while a buyer is in a vehicle. When the vehicle drives into a store, a store computer system 200 recognizes the vehicle's license plate for using it as the vehicle identification and stores it. When the buyer wants to buy a buying item (which can be a product or a service) from the store, the vehicle's computer 100 generates an order and sends it along with the vehicle identification to a financial settlement server 300 via a wireless data communication network. The financial settlement server 300 sends a request for authorizing settlement of the order or transaction to the vehicle computer 100. In response, the vehicle's computer 100 sends authorization information to the financial settlement server 300. Subsequently, the financial settlement server 300 sends transaction approval information including the vehicle identification to the store computer 200. The store computer 200 determines if the vehicle identification matches with that stored in the store computer 200 for finalizing the transaction.

In embodiments, referring to FIGS. 2, 13 and 14, a method of performing a transaction while a buyer is in a vehicle is provided. When the vehicle drives into a store, a store computer system 200 recognizes the vehicle's license plate for using it as the vehicle identification and stores it. When the buyer orders a buying item, a store computer 200 generates an order number and sends it to the vehicle computer 100 via a wireless data communication network. The vehicle computer 100 sends the order number along with the vehicle identification to the financial settlement server 300 via a wireless data communication network. Subsequently, the financial settlement server 300 sends a request for authorizing settlement of the order to the vehicle computer 100. In response, the vehicle's computer 100 sends authorization information to the financial settlement server 200. Subsequently, the financial settlement server 300 sends transaction approval information including the vehicle identification and the order number to the store computer 200. The store computer 200 determines if the vehicle identification and the order number match with those stored in the store computer 200 for finalizing the transaction.

As discussed above, referring to FIGS. 2, 9-14, embodiments provide a method of performing a transaction while a buyer is in a vehicle, the vehicle identification and the order number are used for performing the transaction. The store computer 200 recognizes the vehicle's license plate and uses it as the vehicle identification. The order number (which can be referred to as order code, order identification, transaction number, transaction number or transaction identification) can be generated in the store computer 200, in the vehicle computer 100 or in the financial settlement server 300. When approving the transaction by the store computer 200, the store computer 200 determines if either one of the vehicle identification and the order number matches with corresponding one stored in the store computer 200.

In embodiments, referring to FIGS. 2, 4, 5 and 7-14, the vehicle includes an item recognition device 106 for recognizing a buying item W placed thereon. The device 106 includes a camera 106-1 and a weight scale 106-3. In embodiments, once placing the buying item W on the device 106, the store computer recognizes the buying item and initiates the transaction authorization without any action by the buyer. In embodiments, placing the buying item W causes the vehicle computer 100 to send the payment authorization information to the financial settlement server or payment processing server 300 without the buyer's additional input.

By the vehicle settlement system and method according to an embodiment, the following effects may be achieved.

First, a settlement authentication may be performed using an object designated by a user, thereby achieving personalization of a settlement authentication means.

In addition, the settlement authentication means may be frequently changed, thereby improving the security.

In addition, settlement information may be possessed only by a user and a financial company (for example, a card company, a bank, a securities company, or the like) without being transmitted to a corresponding store, thereby preventing leakage of personal information.

Although a few embodiments of the present disclosure have been shown and described, it should be appreciated by those skilled in the art that changes may be made in these embodiments without departing from the principles and spirit of the disclosure, the scope of which is defined in the claims and their equivalents.

What is claimed is:
1. A system for making one or more payments from a vehicle comprising:
a vehicle control system which is configured to communicate with a financial settlement server and a store computer system via wired or wireless data communication networks,
wherein the vehicle control system includes:
an object recognition module that is provided to collect object information for settlement authentication, and
a vehicle control system control unit that recognizes an object based on the object information collected by the object recognition module,
wherein the object recognition module includes an object recognition area on which an object registered in advance is seated, and a collecting unit that collects object recognition information of the object seated on the object recognition area,
wherein the object recognition information includes weight information and image information of the object seated on the object recognition area, wherein the weight information comprises a set error range based on a weight of the object registered in advance, and wherein the image information contains feature point information of the object registered in advance,
wherein the collecting unit comprises a load cell for collecting the weight information, wherein the load cell comprises a force detector using a strain gauge, and wherein the load cell comprises a compression type load cell, a tension type load cell, or a compression and tension combined type load cell,
wherein the object recognition area is provided at un upper end of a dashboard of the vehicle,
wherein the vehicle control system control unit displays a settlement approval request message on an audio, video, and navigation (AVN) device,
wherein the object recognition module recognizes the seating of the object registered in advance placed by the user based on the displayed settlement approval request message, and
wherein the object registered in advance can be changed to another object.

2. The system according to claim 1, wherein
the vehicle control system further includes a vehicle communication module that is provided to communicate with the financial settlement server and the store system, and
the vehicle control system control unit controls the vehicle communication module to transmit object recognition information to the financial settlement server when it is determined that an object registered in advance is recognized based on the object information collected by the object recognition module.

3. The system according to claim 1, wherein
the vehicle control system transmits settlement authentication information of the vehicle to the financial settlement server in response to a request of the financial settlement server,
the financial settlement server determines a settlement approval when receiving the settlement authentication information of the vehicle from the vehicle control system, and
the store system determines to provide a product or a service to the vehicle when receiving settlement approval information of the vehicle from the financial settlement server.

4. The system according to claim 3, wherein the store system includes
a vehicle recognition module that is provided to collect vehicle information of the vehicle that enters a store, and
a store system control unit that recognizes the vehicle entering the store based on the information collected by the vehicle recognition module.

5. The system according to claim 3, wherein the financial settlement server requests the settlement authentication information from the vehicle control system when receiving order and settlement request information from the vehicle control system, and transmits the order information of the vehicle and the settlement approval information of the vehicle to the store system when receiving the settlement authentication information from the vehicle control system.

6. The system according to claim 4, wherein the store system further includes a store system communication module that is provided to communicate with the financial settlement server and the vehicle.

7. The system according to claim 6, wherein, when the store system receives order information from the vehicle control system, the store system control unit controls the store system communication module to transmit the settlement approval request message to the financial settlement server.

8. The system according to claim 7, wherein the financial settlement server requests settlement information including the settlement authentication information from the vehicle control system when receiving the settlement approval request message from the store system, and transmits the settlement approval information of the vehicle to the store system when receiving the settlement information including the settlement authentication information from the vehicle control system.

9. The system according to claim 6, wherein the store system control unit controls the store system communication module to transmit charge information of the store to the vehicle when the vehicle enters the store.

10. The system according to claim 9, wherein, when the vehicle control system receives the charge information of the store from the store system, the vehicle control system control unit controls the vehicle communication module to transmit a settlement request message to the financial settlement server.

11. A method of making one or more payments from a vehicle comprising:
transmitting, by a vehicle control system, settlement authentication information of a vehicle to a financial settlement server in response to a request of the financial settlement server;
receiving, by the financial settlement server, the settlement authentication information and determining a settlement approval; and
transmitting, by the financial settlement server, settlement approval information of the vehicle to a store system,
wherein the vehicle control system includes an object recognition area on which an object registered in advance is seated, and a collecting unit that collects object recognition information of the object seated on the object recognition area,
wherein the object recognition information includes weight information and image information of the object seated on the object recognition area, wherein the weight information comprises a set error range based on a weight of the object registered in advance, and wherein the image information contains feature point information of the object registered in advance,
wherein the collecting unit comprises a load cell for collecting the weight information of the object seated on the object recognition area, wherein the load cell comprises a force detector using a strain gauge, and wherein the load cell comprises a compression type load cell, a tension type load cell, or a compression and tension combined type load cell,
wherein the object recognition area is provided at un upper end of a dashboard of the vehicle,
wherein the vehicle control system control unit displays a settlement approval request message on an audio, video, and navigation (AVN) device,
wherein the object recognition module recognizes the seating of the object registered in advance placed by the user based on the displayed settlement approval request message, and
wherein the object registered in advance can be changed to another object.

12. The method according to claim 11, wherein
the vehicle control system includes the object recognition module that is provided to collect object information for settlement authentication, and
in the transmitting of the settlement authentication information of the vehicle, the settlement authentication information of the vehicle includes object recognition information collected by the object recognition module.

13. The method according to claim 11, further comprising:
collecting, by the store system, vehicle information about the vehicle when the vehicle enters a store;
transmitting, by the store system, charge information of the store to the vehicle control system of the vehicle; and
transmitting, by the vehicle control system, a settlement request message to the financial settlement server when receiving the charge information of the store from the store system.

14. The method according to claim 11, further comprising:
receiving, by the store system, order information from the vehicle control system;
transmitting, by the store system, the settlement approval request message to the financial settlement server; and
requesting, by the financial settlement server, the settlement authentication information from the vehicle control system.

15. The method according to claim 14, further comprising:
transmitting, by the vehicle control system, order and settlement request information to the financial settlement server;
transmitting, by the financial settlement server, a settlement authentication request message to the vehicle control system;
transmitting, by the vehicle control system, the settlement authentication information to the financial settlement server; and
transmitting, by the financial settlement server, the order information of the vehicle and the settlement approval information of the vehicle to the store system.

* * * * *